Dec. 3, 1957  E. DE FAYMOREAU  2,815,507
SIGNALING SYSTEM
Filed Nov. 9, 1955  3 Sheets-Sheet 1
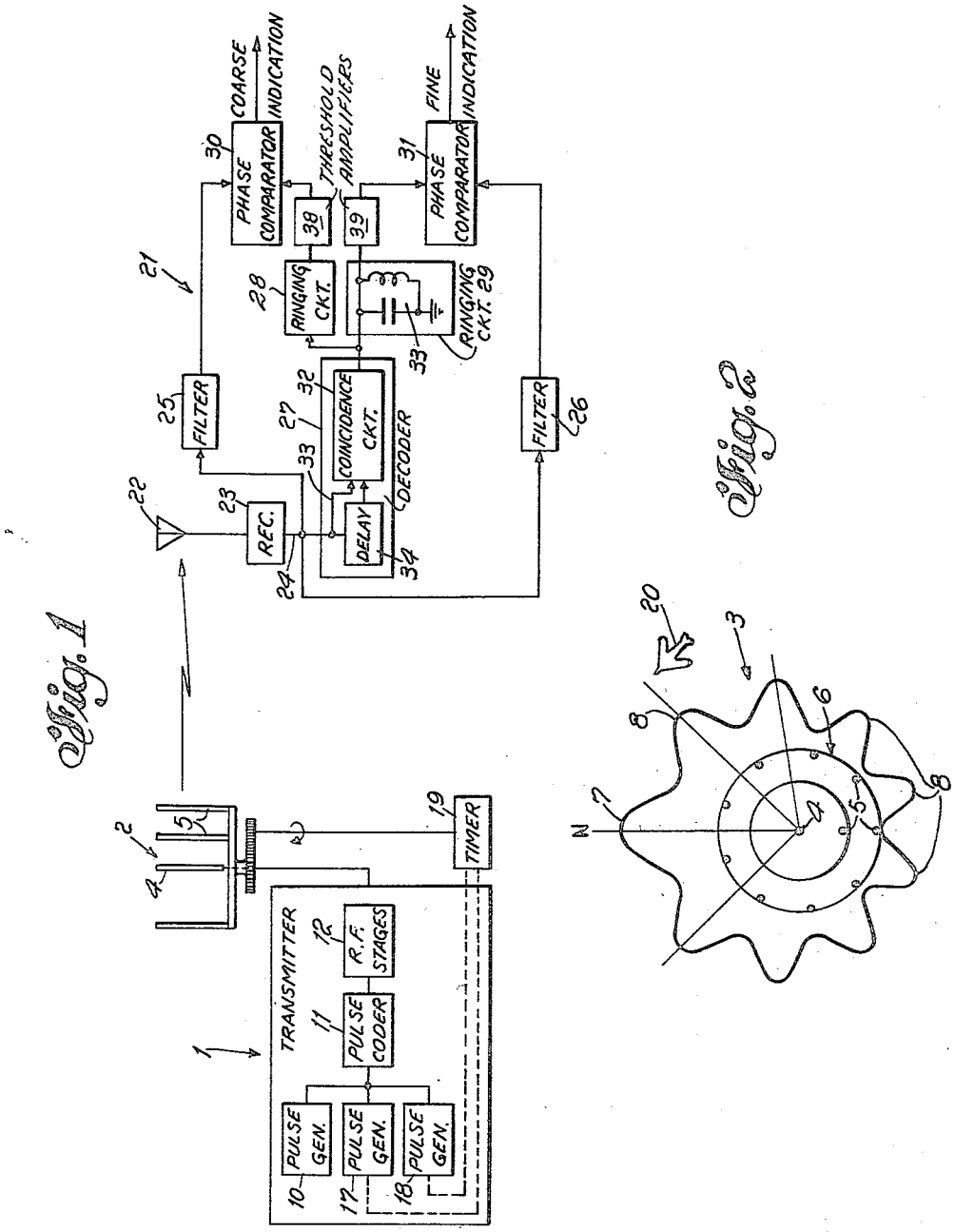
INVENTOR
ETIENNE DE FAYMOREAU
BY Philip M. Bolton
ATTORNEY

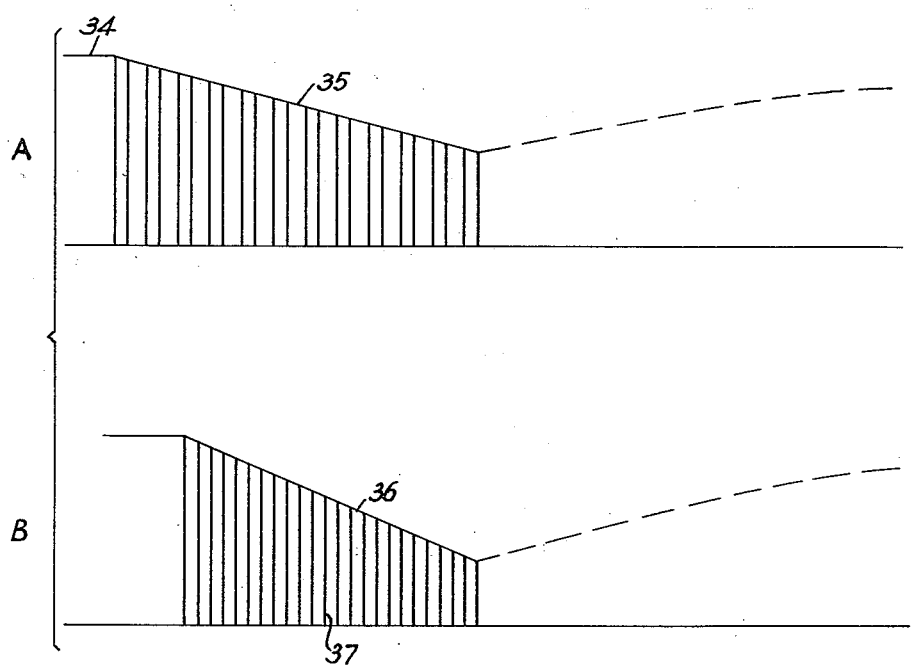

United States Patent Office 2,815,507
Patented Dec. 3, 1957

2,815,507

SIGNALING SYSTEM

Etienne de Faymoreau, Nutley, N. J., assignor to International Telephone and Telegraph Corporation, Nutley, N. J., a corporation of Maryland Application November 9, 1955, Serial No. 546,064

7 Claims. (Cl. 343—106)

This invention relates to a signaling system using paired pulses, such as, for example, the aerial navigation system commonly referred to as "Tacan."

In certain signaling systems pulses are transmitted in pairs having a fixed time spacing. Such pairs of pulses are employed instead of single pulses since the paired pulses may be distinguished from isolated single pulses or groups of pulses having other than the prescribed spacing. The selection of the desired pulses and rejection of the undesired pulses may be accomplished by a decoder in a receiver for such system. All the incoming pulses in the receiver are applied to a coincidence gate directly and also via a delay device which delays each of the pulses by an amount equal to the prescribed spacing between the pulses of each desired pair. The coincidence gate only produces an output when two pulses are simultaneously applied thereto. Thus, when the first pulse of each pair is delayed by the prescribed amount in the delay device, it will reach the coincidence gate simultaneously with the second pulse of each pair which is directly applied and thereby produces an output. It will be seen that isolated single pulses will produce no output from the decoder nor will groups of pulses having other than the desired spacing.

One system using pulse pairs is the aerial navigation system "Tacan." This system includes a beacon transmitter and mobile station receivers, such as, for example, those carried on airplanes. The beacon of this system transmits several different types of pulse signals in pairs but for the purposes of the present invention, only three need be considered. First, there are the semi-random bearing pulses of about 2700 pairs per second or 5400 pulses per second; secondly, there are the "north" signals; and thirdly, there are the "auxiliary" signals. The transmitting antenna system at the beacon produces a directional pattern rotating at about 15 cycles per second. While this pattern is rotating, the semi-random pulses are being emitted in pairs. To a receiver receiving these pulses, the rotation of the antenna pattern produces an amplitude modulation envelope on the pulses, the phase of which envelope varies at different azimuthal angles from the beacon station. When the major lobe of the directional pattern points in a given direction, such as north, a special signal in the form of a short burst of pulses is transmitted from the beacon, which is referred to as the "north" signal. By comparing the phase of the modulation envelope (due to rotation of beacon pattern) with that of the north signal, an indication of the bearing of the receiver with respect to the beacon is obtained. The north signal is produced by spacing a series of successive pairs of pulses a predetermined interval apart, such as, for example, 18 $\mu$secs., the spacing between the pulses of each pair remaining, the same as for the rest of the transmission, 12 $\mu$secs. Throughout this specification, unless the context indicates differently, the spacing between pulses is measured from one edge (usually the leading) of one pulse to the corresponding edge of the next pulse while the spacing between pairs of pulses is measured from one edge (usually the leading) of the second pulse of a pair to the corresponding edge of the first pulse of the next pair.

As has been pointed out in the copending U. S. applications of S. B. Pickles et al., Serial No. 395,648, filed December 2, 1953, entitled "Radio Navigation System"; S. B. Pickles, Serial No. 369,075, filed July 20, 1953, entitled "Omnirange Beacon System," now Patent No. 2,753,556 issued July 3, 1956; and S. B. Pickles et al., Serial No. 448,952, filed August 10, 1954, entitled "Radio Navigation Receiver," if only the north signal and a single-lobed directional pattern is employed, only a relatively coarse indication of bearing is obtainable. To obtain a finer indication, the directional pattern is multilobed, with each lobe separated, for example, by 40° from the next, and with auxiliary pulse signals in the form of short bursts of pulses being emitted each time one of these lobes passes the predetermined reference point (i. e., the north) as the pattern is rotated. The rotation of this pattern produces a modulation envelope of 135 cycles per second (9 lobes multiplied by 15 cycles per second) on top of the fundamental of 15 cycles per cycle due to the main directive lobe. At the receiver, the phase of the auxiliary pulse signals with respect to the 135 cycle per second modulation envelope is compared and a fine indication is thereby obtained.

The auxiliary signals must be able to be distinguished from random external pulse signals and, therefore, like the rest of the pulses in the system, consist of pulse pairs with the pulses of each pair separated by 12 $\mu$secs. The auxiliary signals must also be distinguished from the semi-random bearing pulse pairs and the north signal. Separation of the north signal, the auxiliary signal, and the semi-random bearing pulses occurs after all of these pulses, which are transmitted in pairs, are passed through a common decoder of the type heretofore mentioned, which only passes pulse pairs having the predetermined spacing, thereby blocking noise pulses from entering the system. After decoding the pulses, which are now single pulses, are applied to differently-tuned ringing circuits. For example, the north signal ringing circuit is tuned to about 30 kc. and requires about 11 to 13 pulses to reliably shock excite the ringing circuit so as to cause the amplitude of its oscillations to reach a desired level at which it will operate a device having a predetermined threshold. Isolated single pulses applied to the ringing circuit will not cause a false signal since they will not be suitably timed to build up the amplitude of the oscillations above the threshold. Thus, for the north signal, it will be seen that, assuming 12 pulses are required to produce the desired ringing amplitude, 12 pairs of pulses will be transmitted, with 12 $\mu$secs. spacing of the pulses of each pair and 18 $\mu$secs. spacing between pairs or 30 $\mu$secs. from first pulse of one pair to first pulse of next pair. This means that the 24 pulses will be transmitted in 360 $\mu$secs. (at an average repetition rate of 15 $\mu$secs. between pulses). The beacon which has a relatively low duty cycle during the transmission of the semi-random pairs of pulses, of which there are 5400 per second, has a relatively high duty cycle during the transmission of the special signals: the north signal and the auxiliary signals. The effect of this high duty cycle is to overload the power supply at the transmitter and cause a droop in the output, that is, the amplitude of the pulses emitted decreases as succeeding closely-spaced pulses are being emitted. This introduces an amplitude modulation of the pulses of the north signal which affects the accuracy of reading of the bearing since it changes the contour of the amplitude modulation envelope produced by the rotation of the directional antenna. Since, however, the north pulse signal is only used in obtaining a rather rough indication of bearing, this is not critical. However, with respect to the auxiliary pulse signals which are used in obtaining fine bearing indications, such droop of the pulses cannot be tolerated. It therefore becomes necessary to space the auxiliary pulse pairs so that the minimum number of auxiliary pulses are required to produce the desired ringing at the receiver ringing circuit while at the same time the total time occupied by an auxiliary signal must not be too long as it will tend to produce an error in the indication obtained.

An object of the present invention is the provision of an improved paired pulses signaling system in which different signals are sent using pulse pairs.

In accordance with a major aspect of the present invention, one signal, for example the north signal emitted by a "Tacan" beacon, is transmitted in the form of pairs of pulses with the spacing between the pairs of pulses differing from (usually substantially greater) the spacing between the pulses of a pair, while another type of signal is emitted in which the spacing between pairs is the same as the spacing between the pulses of each pair.

Another object of the present invention is the provision of a paired pulses signaling system of the type described above using a delay line decoder.

Other and further objects of the present invention will become apparent, and the foregoing will be better understood with reference to the following description of an embodiment thereof, reference being had to the drawings, in which:

Fig. 1 is a simplified block diagram of a Tacan transmitter and receiver;

Fig. 2 is a diagram of the radiation pattern of the antenna of the beacon;

Fig. 5 is a set of curves showing the radiated power drooping of the beacon transmitter under overload conditions.

Figure 3:
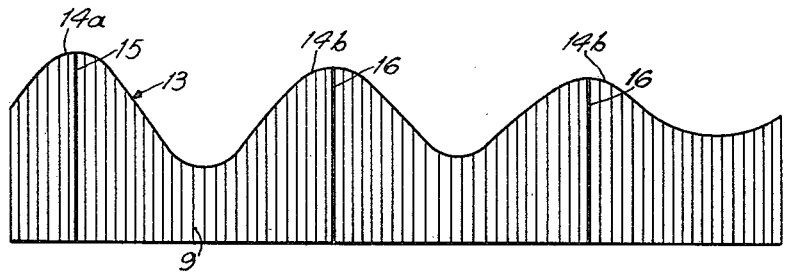
Fig. 3 is a curve showing the effective amplitude modulation envelope of the pulses transmitted from the beacon.
Figure 4:
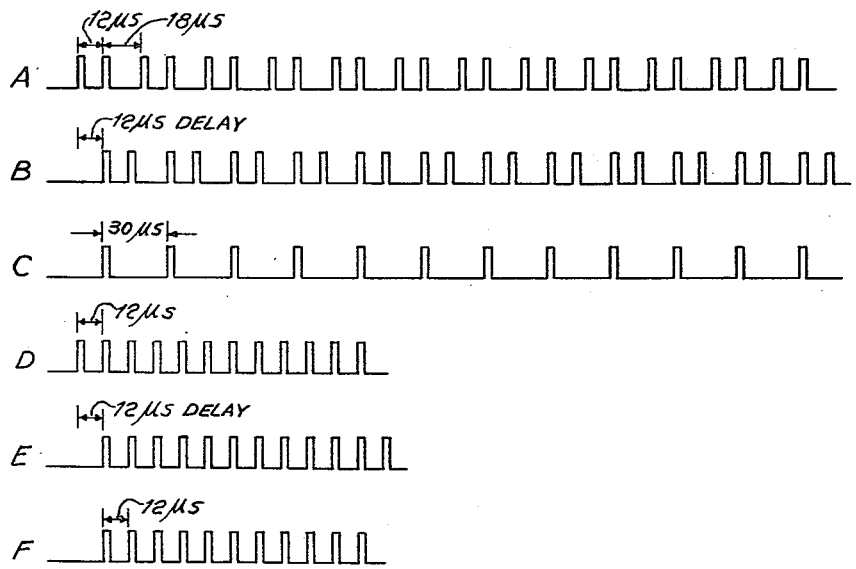
Fig. 4 is a set of curves showing the pulse patterns of the north and auxiliary signals.

Referring now to Fig. 1, a beacon station 1 emits pulses from its rotating antenna 2 according to a multilobed directional pattern 3, such as shown in Fig. 2. The pattern is rotated at the rate of 15 cycles per second. The antenna system may consist of a central omnidirectional antenna 4 with passive reflectors 5 spaced thereabout at 40° separation, the reflectors being, for example, printed on a pair of cylinders 6 which rotate around the central radiator 4, the pattern consisting of a major lobe 7 with minor lobes 8 spaced every 40° therefrom. The semirandom pulses 9 (see Fig. 3) are generated by a pulse generator 10 in the beacon which may be, for example, a free-running blocking oscillator. These pulses 9, generated at about 2700 per second, are then applied to a pulse coder 11, which changes each single pulse into a pair of pulses 12 μsecs. The pulses from the coder 11 are used to key or modulate R.-F. oscillations or amplifier stages 12 and the R.-F. pulses are then fed to the antenna system 2 from whence they are emitted according to the directional pattern 3 of Fig. 2. The rotation of the reflectors, in effect, produce an amplitude modulation envelope 13 on the pulses, with a maximum amplitude peak 14a corresponding to the maximum lobe 7 and the other peaks 14b corresponding to the minor lobes 8. As the antenna system 2 rotates so that the major lobe 7 passes a given reference direction, such as, for example, north, a special pulse signal is emitted which is called hereinafter the "north" signal 15. While north signal 15 is shown as a solid black line in Fig. 3, it actually consists of a number of pulses closely spaced together, as will be pointed out hereinafter in connection with Fig. 4A. As each minor lobe 8 passes the reference direction, remembering that the minor lobes are spaced by 40° from each other and from the north lobe, an "auxiliary" signal 16 is emitted. This, likewise, is shown in Fig. 3 as a solid black line, but actually consists of a series of pulses closely spaced together, as will be explained in connection with Fig. 4D. It might also be pointed out at this time, referring to Fig. 3, that the random pulses 9, shown as single lines, actually consist of pairs of pulses due to the fact that these random pulses 9 pass through the pulse coder 11, which produces pairs of pulses, as pointed out hereinbefore, in which the pulses of each pair are spaced 12 μsecs. The north signal 15 may be produced by a pulse generator 17 which produces 12 pulses separated by 30 μsecs., which pulses are applied to the pulse coder 11 thereby producing 12 pulse pairs, or 24 pulses, with the spacing between the pulses of a pair being 12 μsecs. and the spacing between pairs being 18 μsecs., as shown in Fig. 4A. The pulses may have a width of 3.5 μsecs.

The auxiliary signal 16 may be generated by a generator 18 producing a burst of six pulses, spaced 24 μsecs. apart (from leading edge to leading edge), which are fed from the generator 18 into the pulse coder 11 where the six pulses are then doubled to become 6 pairs of pulses or 12 pulses with a 12 μsecs. spacing between adjacent pulses.

Suitable timing means 19, which can take any one of various forms well-known in the art, may be associated with the antenna system 2 and pulse generators 17 and 18 to cause the north and auxiliary reference signals to be emitted at the proper time. The emitted pulses are received on a receiver 21 located in a mobile vehicle 20 (Fig. 2), such as, for example, an airplane. The signal is picked up on an omni-directional antenna 22 and fed to a receiver 23, which removes the R.-F. envelope and detects the signal. The output of the receiver 23 is fed via line 24 to two filters 25 and 26, filter 25 being arranged to separate the 15 cycle per second component of the amplitude modulation envelope, which is the component produced by the major lobe for each rotation, and filter 26 being tuned to 135 cycles per second to select the 40° minor lobe components. The output of receiver 23 is also applied to a decoder 27, which produces an output pulse for each input pulse spaced 12 μsecs. from a prior input pulse. The output of the decoder 27 is then fed to a north signal separation circuit 28 and an auxiliary signal separation circuit 29. The separated north signal is compared in a phase comparator 30 with the 15 cycle per second wave output of filter 25 and, depending upon this comparison, a rough indication of direction or bearing is obtained. A second phase comparison circuit 31 compares the phase of the 135° per second wave from filter 26 with the separated auxiliary signal and produces a fine indication within a 40° sector, the rough indication produced by the phase comparator 30 indicating which 40° sector is referred to in the fine indication.

It will be readily recognized that at the receiver the difference in phase between the 15 cycle per second wave and the north reference signal will indicate the bearing of the receiver with respect to the beacon. Assuming that the 15 cycle per second signal is at its maximum when the north signal is received, then it will be obvious that the receiver is directly north of the beacon. If the receiver is in other positions, there will be a phase displacement between the maximum of the 15 cycle per second and the time the north signal is received. The same argument applies to the minor lobes and the associated auxiliary signals. When an auxiliary signal coincides with one of the 135 cycle per second maximums, then it will be clear that the receiver is exactly at 40° angles or an integral multiple thereof with respect to the north. If, on the other hand, there is a phase displacement between the two, then it will be apparent that the receiver is between two such angles or at a given angle within a 40° sector. The 40° sector in which the receiver is located is obtained from the north signal comparison, while the exact position within the sector is determined from the auxiliary signal comparison.

The decoder 27 is preferably of the type described in the copending U. S. application of E. de Faymoreau-M. Mandel, Serial No. 519,303, filed July 1, 1955, entitled "Pulse Repetition Rate Selector." As shown in somewhat simplified form, the decoder 27 consists essentially of a coincidence circuit 32 to which the input pulses are fed directly along line 33, the pulses likewise being fed to the coincidence circuit 32 through a delay device 34 having a delay of 12 μsecs. The coincidence circuit 32 produces an output when a delayed pulse coincides with an input pulse directly applied thereto. In the arrangement described in U. S. application Ser. No. 519,303, a pentode is used with the input pulses being applied to the first grid and taken off the second grid, and applied to an inverting delay line which feeds back the inverted and delayed pulses to the third grid so that, when a delayed pulse on the third grid coincides with an incoming pulse of the first grid, a pulse of current is sent to the anode circuit. Thus, the first and third grids of an anode cooperate as a coincidence circuit 32 while the delay line serves as the delay device 34. It might also be pointed out that a ringing circuit, such as ringing circuits 28 or 29, is disclosed in the anode circuit of said pentode. Various other arrangements for decoding by the delay of one pulse with respect to the other will occur to those versed in the art.

Referring to Fig. 4B, it will be seen that for the 24 north signal pulses consisting of 12 pairs, there will be coincidences of 12 of the delayed pulses, which delayed pulses are shown in Fig. 4B, with 12 of the 24 undelayed input pulses resulting, therefore, in a 12 pulse output the pulses being separated by 30 μsecs., as shown in curve 4C. A different situation occurs with respect to the auxiliary pulses shown in 4D. When these are delayed in delay device 34, 11 of the delayed pulses (shown in 4E) coincide with 11 of the undelayed pulses of 4D, thus producing an output of 11 pulses, as shown in curve 4F, having a spacing of 12 μsecs. The north pulse separator 28 and the auxiliary pulse separator 29 both include ringing circuits 33. The ringing circuit of the north signal separator 28 is tuned to approximately 30 kc. to respond to the north signal pulses, shown in curve 4C, which are separated by 30 μsecs. The auxiliary pulse ringing circuit 33 is tuned to approximately 80 kc. to respond to the auxiliary pulses (curve 4F), as obtained from the decoder 27, which are separated by 12 μsecs. Each properly-timed succeeding pulse increases the amplitude of the oscillations of the ringing circuit 33 until a desired maximum amplitude is obtained, this amplitude being sufficient for the output of the signal separator to be employed in the phase comparison circuit 31. For this purpose, a threshold device may be incorporated either in the phase comparator or threshold devices 38 and 39 may be inserted between the auxiliary signal separator and the north signal separator and their respective comparators, as illustrated in Fig. 1.

As has been heretofore pointed out, it takes about 11 properly-timed pulses to ring the ringing circuit 33 so that it reaches and stays at its maximum (above the threshold) long enough for the phase comparison to occur. Pulses whose spacing does not correspond to the repetition frequency to which the ringing circuit is tuned will not produce oscillations of sufficient amplitude to produce a false indication.

The rapid succession of pulses required to produce the north and auxiliary signals tends to overtax the power supply of the beacon. For example, referring to Fig. 5A in which the 24 north pulses are shown, it will be seen that the amplitude level 34 of the transmitter output would droop, as indicated at 35, the droop increasing the greater the number of successive pulses required to be transmitted. In addition to the amount of energy expended in sending out all these pulses, the droop has a further undesirable characteristic, that is, it produces an amplitude modulation which has nothing to do with the bearing indication amplitude modulation produced by the rotation of the antenna system. This may be considered as crosstalk and interferes with the accuracy of the bearing indication. These are not, however, too serious problems with respect to the north signal since the north signal is only used in obtaining a rough indication and, furthermore, there is only one north signal for each complete rotation of the directional pattern. These would, however, be very serious with respect to the auxiliary pulse signal since the auxiliary pulse signal is depended on for a fine indication and there are eight auxiliary signals emitted for every rotation of the directive pattern and, therefore, there are eight times as many auxiliary pulse signals as north pulse signals using so much more energy. Thus, referring to Fig. 5B, it will be seen that where 24 auxiliary reference pulses are transmitted, a severe droop would be obtained, as shown at 36. However, due to the unique spacing of the pulse pairs in the auxiliary reference pulse signal as shown in Fig. 4D, only 12 pulses (six pairs) are required to produce 11 ringing pulses and since only 12 closely spaced pulses are emitted and not 24, the droop does not reach the level indicated at the bottom of curve 36 but halts at a point 37 which is considerably less and represents a substantial improvement in crosstalk and power consumption (duty cycle load).

In the foregoing description, details obvious to those versed in the art have been omitted, such as the nature of the various devices included in the rectangles of the drawings and numerous alternative arrangements which should likewise be obvious.

Accordingly, while I have described above the principles of my invention in connection with specific apparatus, it is to be clearly understood that this description is made only by way of example and not as a limitation to the scope of my invention as set forth in the objects thereof and in the accompanying claims.

I claim:

1. A signaling system comprising a transmitter including means for generating a first train of pairs of pulses in which the pulses of each pair are separated by a predetermined time interval and the second pulse of each pair is spaced from the first pulse of the next pair by a different time interval, means for generating a second train of pairs of pulses in which the pulses of each pair are spaced by a predetermined time interval and the second pulse of each pair is spaced from the first pulse of the next pair by the same predetermined time interval, a transmission medium, and means for applying said pairs of pulses to said transmission mediums; and a receiver including means for receiving said pulse pairs, means responsive to successive pulses for producing an output pulse for each input pulse that follows a prior input pulse with said predetermined time spacing whereby said output pulses corresponding to said first train of pairs of pulses have a different repetition frequency from those output pulses derived from the second train of pairs of pulses, and means responsive to said different repetition frequencies for producing different signals.

2. A signaling system comprising a transmitter including means for generating a first signal in the form of pairs of pulses in which the pulses of each pair are spaced by a predetermined time interval and the second pulse of each pair is spaced from the first pulse of the next pair by a different time interval, means for generating a second signal in the form of a train of pairs of pulses in which the pulses of each pair are spaced by a predetermined time interval and the second pulse of each pair is spaced from the first pulse of the next pair by said predetermined time interval, a transmission medium, and means for applying said pairs of pulses to said transmission medium; and a receiver including means for receiving said pulse pairs, means responsive to successive pulses of said pairs for producing an output pulse for each input pulse that follows a prior input pulse with said predetermined time spacing whereby for each pair of pulses of said first signal a single output pulse is produced, while for a given number of pulses of said second signal, the same number less 1 output pulses are produced, the output pulses derived from the first signal having a different repetition frequency from those derived from the second signal, and means responsive to the different pulse repetition frequencies for producing different output signals.

3. A signaling system comprising a transmitter including means for generating a first train of pulses having a given time spacing, means for generating a second train of pulses having a time spacing different from said given time spacing, means responsive to the pulses of said trains for producing in response to each pulse a second pulse spaced therefrom by a predetermined time spacing equal to half said given time spacing, a transmission medium, and means for applying the pairs of pulses thus produced to said transmission medium; and a receiver having means for receiving said pulse pairs, means responsive to successive pulses of said pairs for producing an output pulse for each input pulse that follows a prior input pulse with said predetermined time spacing, whereby output pulses of one repetition frequency are derived from said first pulse train and output pulses of a second repetition frequency are derived from said second pulse train, and means responsive to different repetition frequencies for producing different signals.

4. A signaling system according to claim 3, wherein said means responsive to the different repetition frequencies of the output pulses includes resonant circuits each tuned to a different frequency directly related by an integer to a different one of the pulse repetition frequencies.

5. In combination, a source of pulse pairs in which the pulses in each pair are separated by a predetermined time interval, one group of said pulse pairs having a spacing between the second pulse of each pair and the first pulse of the next pair which is equal to said predetermined time interval, a second group of said pulse pairs having a spacing between the second pulse of each pair and the first pulse of the next pair which is different from said predetermined time interval, and means responsive to the successive pulses of said pairs for producing an output pulse for each input pulse that follows a prior input pulse with said predetermined time spacing whereby for N pulses of said first group there is produced $N-1$ output pulses while for N pulses of the second group there is produced $N/2$ output pulses.

6. A combination according to claim 5, wherein said means responsive to said pulses includes a coincidence device having two inputs and adapted to produce an output pulse when a pulse is applied to one input simultaneously with the application of a pulse to another output, means for applying the pulses from said source directly to one input, a delay device introducing a delay equal to said predetermined time spacing, means for applying the pulses from said source to said delay device, and means for applying the delayed pulses from said delay device to said other input of said coincidence device.

7. In a navigation system a rotating antenna system having a multilobed directional radiant action pattern having a given lobe and a plurality of other lobes symmetrically arranged in said pattern, means for generating a group of widely spaced pulses, means for generating a first type of short burst of relatively closely spaced pulses when said given lobe of the directional radiant action pattern points in a given direction, means for generating a second type of short burst of closely spaced pulses each time one of said other lobes points in said given direction, a coder responsive to said generated pulses for producing for each pulse a pair of pulses spaced by a predetermined time interval, the interval between successive pulses of said second burst being equal to twice said predetermined time interval while the spacing between the pulses of said type of short burst are different from those of said second type of short burst, and means including said antenna system for transmitting the output pulse pairs from said coder; and a receiver including means for receiving said pulses, filtering means for separating out the modulation envelopes of said pulses produced by rotation of said transmitter radiant action pattern, means responsive to successive pulses for producing an output pulse for each input pulse that follows a prior input pulse with said predetermined time spacing whereby for N pulses of said first burst there is produced $N/2$ output pulses while for N pulses of said second burst there is produced $N-1$ output pulses, the $N-1$ output pulses having a different repetition frequency from the $N/2$ output pulses, means responsive to the $N/2$ output pulses to produce a first output signal and means responsive to the $N-1$ output pulses for producing a second output signal, means for comparing the phase of said first output signal with the phase of the modulation envelope derived from the rotation of said given lobe to give a coarse indication of bearing, and means for comparing the phase of said second output signals with the modulation envelope derived from the rotation of said other lobes to obtain a fine indication of direction.

References Cited in the file of this patent
UNITED STATES PATENTS

| 2,539,905 | Herbst | Jan. 30, 1951 |
| 2,585,002 | Frum | Feb. 12, 1952 |